(12) United States Patent
Samrane et al.

(10) Patent No.: US 11,873,229 B2
(45) Date of Patent: Jan. 16, 2024

(54) PROCESS FOR PREPARING CALCIUM FLUORIDE FROM FLUOSILICIC ACID

(71) Applicant: OCP SA, Casablanca (MA)

(72) Inventors: Kamal Samrane, Casablanca (MA); Abdelaali Kossir, El Jadida (MA)

(73) Assignee: OCP SA

( * ) Notice: Subject to any disclaimer, the term of this patent is extended or adjusted under 35 U.S.C. 154(b) by 0 days.

(21) Appl. No.: 15/568,089

(22) PCT Filed: Apr. 22, 2016

(86) PCT No.: PCT/MA2016/000009
§ 371 (c)(1),
(2) Date: Oct. 20, 2017

(87) PCT Pub. No.: WO2016/171535
PCT Pub. Date: Oct. 27, 2016

(65) Prior Publication Data
US 2018/0155207 A1    Jun. 7, 2018

(30) Foreign Application Priority Data
Apr. 22, 2015   (EP) ..................................... 15164685

(51) Int. Cl.
*C01F 11/22*     (2006.01)
*C01B 33/18*     (2006.01)
(Continued)

(52) U.S. Cl.
CPC .............. *C01F 11/22* (2013.01); *B01J 10/00* (2013.01); *C01B 33/186* (2013.01); *C01C 1/026* (2013.01);
(Continued)

(58) Field of Classification Search
CPC ........... C01B 33/186; C01C 1/26; C01F 11/22
See application file for complete search history.

(56) References Cited

U.S. PATENT DOCUMENTS 2,780,521 A    2/1957  Butt
2,780,523 A    2/1957  Gloss
(Continued)

FOREIGN PATENT DOCUMENTS

CN    102502753 A    6/2012
CN    103073040 A    5/2013
EP     0684067 A1    11/1995

OTHER PUBLICATIONS

Extended European Search Report for Appl. No. EP15164685.8 dated Oct. 8, 2015.
(Continued)

*Primary Examiner* — Anita Nassiri-Motlagh
(74) *Attorney, Agent, or Firm* — Lerner David LLP

(57) ABSTRACT

A process for preparing synthetic calcium fluoride ($CaF_2$) (min 90% $CaF_2$ by weight) from fluosilicic acid is provided. The processes comprises the steps of (a) reacting fluosilicic acid ($H_2SiF_6$) with ammonium hydroxide or ammonia in a first reactor so as to obtain a first slurry and filtering the first slurry so as to obtain a filtrate containing a solution of ammonium fluoride (b) precipitating the solution of ammonium fluoride with calcium in a second reactor so as to produce a second slurry containing calcium fluoride and (c) evolving the major part of ammonia from the second reactor and then scrubbing and returning said ammonia to the first reactor.

10 Claims, 1 Drawing Sheet

(51) Int. Cl.
*C01C 1/02* (2006.01)
*C01C 1/26* (2006.01)
*B01J 10/00* (2006.01)

(52) U.S. Cl.
CPC ............ *C01C 1/26* (2013.01); *C01P 2004/61* (2013.01); *C01P 2006/12* (2013.01); *C01P 2006/80* (2013.01)

(56) References Cited

U.S. PATENT DOCUMENTS

| | | | |
|---|---|---|---|
| 3,271,107 A | | 9/1966 | Nickerson et al. |
| 3,907,978 A | | 9/1975 | Spreckelmeyer |
| 3,923,964 A | * | 12/1975 | Kidde .................. C01F 11/22 |
| | | | 423/490 |
| 4,031,193 A | | 6/1977 | Becher et al. |
| 4,279,703 A | * | 7/1981 | Kwasnoski ............. B01D 3/22 |
| | | | 202/158 |
| 4,915,705 A | | 4/1990 | Mollere et al. |
| 6,224,844 B1 | | 5/2001 | VerNooy et al. |
| 6,355,221 B1 | * | 3/2002 | Rappas .................. C01B 7/192 |
| | | | 423/158 |

OTHER PUBLICATIONS

International Search Report for Appl. No. PCT/MA2016/000009 dated Feb. 8, 2017.

\* cited by examiner

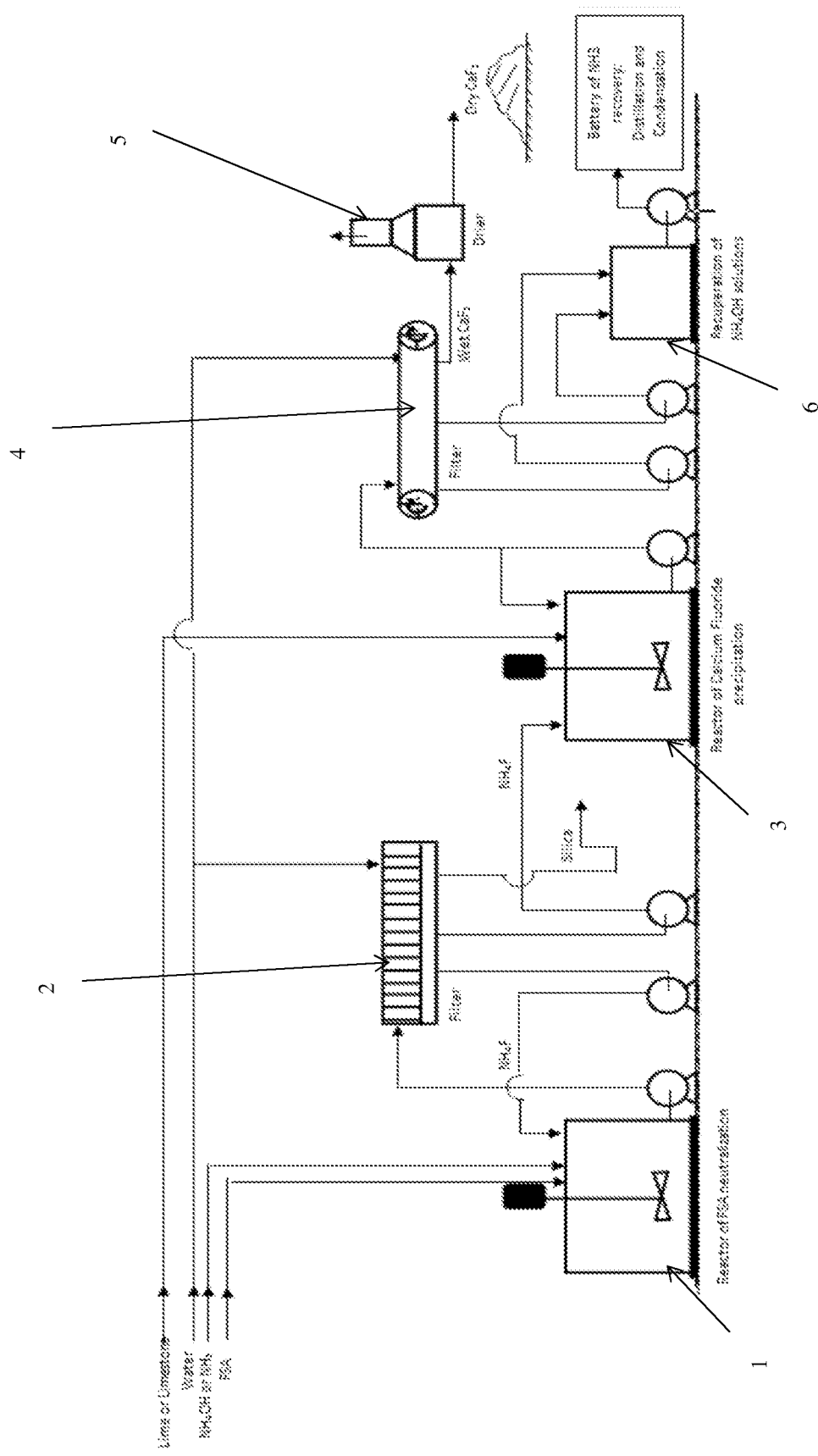

PROCESS FOR PREPARING CALCIUM FLUORIDE FROM FLUOSILICIC ACID

CROSS REFERENCE TO RELATED APPLICATIONS

The present application is a national phase entry under 35 U.S.C. § 371 of International Application No. PCT/MA2016/000009 filed Apr. 22, 2016, which claims priority from European Patent Application No. 15164685.8 filed Apr. 22, 2015, the disclosures of which are incorporated herein by reference.

FIELD OF THE INVENTION

The invention relates to a process for the preparation of synthetic calcium fluoride ($CaF_2$) and active silica from fluosilicic acid ($H_2SiF_6$).

BACKGROUND OF THE INVENTION

Phosphate rocks contain 2 to 4 percent of fluorine.

A part of the fluorine from the phosphate rock is precipitated with gypsum, another part is leached out with the phosphoric acid product, and the remaining portion, which represents about 70% of the total fluorine, is vaporized in the reactor and the evaporator.

As environmental regulations continue to reduce chemical processing emissions, phosphate plants operators will eventually be required to neutralize fluoride waste materials.

Most phosphate plants currently use direct contact barometric condensers with recirculating cooling pond water that is saturated with fluoride salts.

Most of this fluoride is allowed to precipitate as the recirculating water cools in large cooling pond systems.

When the fluoride contaminated water treatment is required, phosphate producers typically use lime or limestone neutralization prior to discharging effluent.

A better environmental alternative should use scrubbers to remove fluorides as fluosilicic acid prior to condensing the vapors in barometric condensers.

If the fluosilicic acid could not be used as it is, it could then be neutralized with several calcium compounds such as phosphate rock, lime and limestone, which are not profitable methods.

At the present time, the most important outlets of fluosilicic acid are fluoridation of drinking water, manufacturing of silicofluoride, hydrogen fluoride and the aluminium fluoride which is the most significant chemical use worldwide of fluosilicic acid.

In the past several processes have been developed to make possible the valorization of fluosilicic acid into hydrogen fluoride or aluminium fluoride, however, none of these processes is being suitable to absorb the overall quantities of fluosilicic acid generated by the phosphate producers.

So there is a need to other ways to convert the fluosilicic acid to more suitable fluorinated products such as synthetic calcium fluoride.

Synthetic calcium fluoride could advantageously substitute the fluorspar which is the most common starting mineral for all fluorine products, especially when considering the highest cost of the fluorspar as a result of the resources decreasing and because of its export limitation all over the world.

Therefore, some processes have been developed to produce calcium fluoride from fluosilicic acid by a reaction with calcium carbonate ($CaCO_3$) or calcium hydroxide $Ca(OH)_2$.

In this regard, U.S. Pat. Nos. 2,780,521 and 2,780,523 describe the reaction of diluted fluosilicic acid having a concentration between 2.5 and 3.8% with lime. According to these patents if the reaction is carried out in a pH range of 3.5-6.7, calcium fluoride $CaF_2$ is to be separable in an easily filterable form the concurrently produced $SiO_2$-sol.

A big disadvantage of the process described in U.S. Pat. No. 2,780,521 is the fact that one obtains a calcium fluoride product which contains between 4 and 7% of $SiO_2$ as an impurity. Such a material has little suitability for the production of hydrogen fluoride.

In the process described in U.S. Pat. No. 2,780,523, one obtains a calcium fluoride product having only a small content of $SiO_2$, i.e. about 0.5% or less. This is said to be accomplished by adding to the diluted fluosilicic acid not more than 85% of the amount of calcium carbonate $CaCO_3$ stoichiometrically required for the formation of calcium fluoride. After filtration of the obtained product, the filtrate is once more treated with calcium carbonate to achieve a pH value of between 7 and 7.3. The product yielded in this step constitutes a mixture of calcium fluoride and calcium silicofluoride which is not usable. Besides, a further disadvantage is to be seen in the fact that relatively long reaction periods of approximately 30 minutes to two hours are required. Furthermore, a considerable weakness of both above-described processes is the fact that only very diluted fluosilicic acid (maximum concentration 4-6%) may be employed.

Accordingly, the industrial production of hydrogen fluoride still proceeds today exclusively from natural fluorspar which is reacted in the form of the so-called acid grade spar (acidspar) with more than 97% calcium fluoride $CaF_2$.

Therefore, there is a need to convert into calcium fluoride the fluosilicic acid produced as a by-product in ever increasing amounts during the production of super phosphates and wet phosphoric acid. Accordingly, the fluoride obtained in such a form can be immediately converted to hydrogen fluoride in existing industrial plants. Moreover, calcium fluoride will be seen as a fluorine reserve, since it may be safely stockpiled.

U.S. Pat. No. 4,031,193 provides a process for the preparation of calcium fluoride from fluosilicic acid which comprises the steps of reacting the fluosilicic acid with calcium carbonate, preferably in the form of an aqueous suspension, at a pH value of between about 2 and 6, preferably between about 3 and 5, and in the presence of sulfate and/or aluminum ions, whereby a calcium fluoride precipitates and an aqueous silica sol are formed, and thereafter separating the calcium fluoride precipitate from the aqueous silica sol.

U.S. Pat. No. 3,271,107 provides a method to manufacture high grade silica from fluosilicic acid by the reaction of the fluosilicic acid with ammonium hydroxide in two separate stages which comprise reacting fluosilicic acid with ammonium hydroxide in a reaction zone of high agitation and adjusting the proportions of the reactants to maintain a pH in the range of 6.0 to 8.0, whereby a silica containing slurry is produced, then reacting said slurry in a quiescent reaction zone with additional ammonium hydroxide in a sufficient amount to provide a final pH from 8.3 to 9.0 for a time of about 20 minutes to 120 minutes, and separating precipitated silica from the resulting slurry.

U.S. Pat. No. 6,224,844 provides a process for producing calcium fluoride comprising: (a) mixing phosphoric acid ($H_3PO_4$) with aqueous $H_2SiF_6$ to form a mixture such that the concentration of $H_3PO_4$ is at least about 3 moles/liter, (b) adding phosphate rock to the mixture at a rate such that the pH of the mixture is maintained at less than about 1.0 and at a temperature sufficient to from a second mixture containing calcium fluoride, and (c) separating calcium fluoride from said second mixture.

Documents CN 103073040, CN 102502753 and U.S. Pat. No. 4,915,705 each disclose a process for producing calcium fluoride from fluosilicic acid, comprising the following steps:
(a) reacting fluosilicic acid with ammonium hydroxide or ammonia in a first reactor so as to obtain a first slurry; filtering said first slurry so as to obtain a filtrate containing a solution of ammonium fluoride;
(b) precipitating the solution of ammonium fluoride obtained as a filtrate in step (a) with calcium hydroxide in a second reactor so as to produce a second slurry containing calcium fluoride and ammonium hydroxide; filtering said second slurry so as to obtain a filter cake containing calcium fluoride and a filtrate containing a solution of ammonium hydroxide; washing and drying said filter cake so as to obtain calcium fluoride and a filter cake washing containing a solution of ammonium hydroxide.

However, because of the use of calcium hydroxide to precipitate calcium fluoride, the chemistry and the kinetics of the reaction are not so favorable to allow easily obtaining calcium fluoride with the desired grade of purity and granulometry for Acidspar market. In addition, the fluorine and ammonia losses during calcium fluoride separation are enormous due to calcium fluoride crystals form and shape. Furthermore, the ammonium hydroxide filtrate is much concentrated on $NH_3$ which make ammonia recovery very difficult and costly.

BRIEF DESCRIPTION OF THE INVENTION

A goal of the invention is to provide a new process for producing high grade synthetic calcium fluoride (min 90% wt $CaF_2$) at a competitive cost.

The invention relates to a process for preparing synthetic calcium fluoride ($CaF_2$) min 90% $CaF_2$ from fluosilicic acid, comprising the following steps:
(a) reacting fluosilicic acid ($H_2SiF_6$) with ammonium hydroxide or ammonia in a first reactor so as to obtain a first slurry; filtering said first slurry so as to obtain a filtrate containing a solution of ammonium fluoride;
(b) precipitating the solution of ammonium fluoride obtained as a filtrate in step (a) with calcium carbonate as a dry form or as a suspension at a concentration ranging from 10 to 80% by weight in a second reactor so as to produce a second slurry containing calcium fluoride and ammonium carbonate; filtering said second slurry so as to obtain a filter cake containing calcium fluoride and a filtrate containing a solution of ammonium carbonate; washing and drying said filter cake so as to obtain calcium fluoride and a filter cake washing containing a solution of ammonium carbonate;
(c) evolving the major part of ammonia from the second reactor in step (b) because of the partial decomposition of ammonium carbonate under reactor conditions and then scrubbing and returning said ammonia to the first reactor, and gathering and treating by distillation and condensation both ammonium carbonate solutions obtained as the filtrate and the filter cake washing in step (b) to recover liquid ammonia which is recycled to the first reactor.

To enhance calcium fluoride crystallization in the second reactor in step (b), a quantity of the second slurry ranging from 10 to 70% is recycled to the second reactor while the remaining second slurry is filtered to recover the calcium fluoride, which is washed and dried.

Advantageously, at step (a) the filtration of the first slurry produces a filter cake containing silica which is precipitated amorphous silica and said silica cake is further washed and dried.

According to an embodiment, the calcium source used is a high grade limestone ($CaCO_3$).

According to an embodiment, the concentration of the fluosilicic acid used in step (a) is between 5 and 40% by weight.

According to an embodiment, the fluosilicic acid used in step (a) is a by-product of phosphate rock acidulation.

Advantageously, the conditions of the reaction carried out in the first reactor in step (a) comprise at least one of:
agitation of the mixture;
a temperature between 20 and 90° C.;
a pH ranging from 5 to 11; and
a residence time between 15 and 360 minutes.

According to an embodiment, the filter cake washing obtained in step (a) contains a solution of ammonium fluoride which is recycled to the first reactor or to the second reactor, and the filtrate obtained in step (a) is sent to the second reactor.

According to an embodiment, the pH of calcium fluoride precipitation in step (b) is in the range of 6 to 12 and the weight ratio Ca/F is greater than 0.5.

Advantageously, the conditions of the reaction carried out in the second reactor in step (b) comprise at least one of:
agitation of the mixture;
a temperature between 60 and 90° C.;
a residence time between 30 minutes and 60 minutes.

The ammonia obtained in step (c) may be used in step (a) as it is or as an ammonium carbonate solution.

BRIEF DESCRIPTION OF THE DRAWINGS

Other features and advantages of the invention will be apparent from the following detailed description in connection with the appended drawings, wherein the FIGURE illustrates schematically an installation for carrying out the process according to the invention.

DETAILED DESCRIPTION OF EMBODIMENTS OF THE INVENTION

This invention provides a process for producing high grade synthetic calcium fluoride min 90% $CaF_2$ and active silica which is an amorphous precipitated silica from fluosilicic acid obtained as by-product from phosphate rock acidulation as a result of the fluorinated gas treatment.

The process is involving the ammonia route for the production of synthetic $CaF_2$ and active silica ($SiO_2$) from fluosilicic acid.

The process comprises two main steps.

Fluosilicic acid is provided as an aqueous solution.

The concentration of fluosilicic acid in said aqueous solution is advantageously ranging from 5 to 40% by weight.

The first process step comprises the neutralization of the fluosilicic acid by adding ammonia as liquid solution or gas in a reactor.

Whether ammonia or an ammonium hydroxide solution is used, the pH of this solution is greater than 7, preferably greater than 8, more preferably greater than 9.

If a solution of ammonium hydroxide is provided, the concentration of $NH_3$ in the solution is preferably comprised between 10 and 35% by weight.

In order to improve the efficiency of the reaction, the reaction has to be carried out with appropriate agitation and/or under suitable temperature. For example, the reaction temperature may range from 20° to 90° C.

The reaction between the fluosilicic acid solution and ammonia produces a slurry.

Said slurry is filtered using vacuum filter with a pore size of 100 μm or more preferably using press filter, so as to obtain, on the one hand, a filtrate that comprises a solution of ammonium fluoride and, on the other hand, a filter cake that comprises active silica.

The products of the first process step are thus ammonium fluoride ($NH_4F$) (as a liquid form) and active silica $SiO_2$ (as a solid form).

In view of subsequently using said active silica, the active silica may be further washed by fresh water, dried at 110° C. and disposed.

The second process step comprises the precipitation of $NH_4F$ by adding a source of calcium which is a high grade limestone ($CaCO_3$).

The calcium source is provided as a suspension of calcium carbonate in an aqueous solution. The concentration of the suspension ranges from 10 to 80% by weight. Otherwise, the calcium carbonate can be provided as a dry form.

The required quantity of calcium source is chosen to meet a weight ratio of Ca/F greater than or equal to 0.5, typically equaling 1 in the reaction mixture.

The pH of the reaction mixture is basic, preferably greater than 8, more preferably greater than 9, and even more preferably greater than 10.

In order to improve the efficiency of the reaction which is endothermic, the reaction may be carried out with appropriate agitation and/or under suitable temperature. For example, the reaction temperature may range from 60° to 90° C. In particular, contrary to the reaction between calcium hydroxide and ammonium fluoride which is exothermic, the reaction between calcium carbonate and ammonium fluoride is endothermic. Heating the mixture in the reactor thus allows better solubilizing the calcium source, decreasing the reaction time and enhancing calcium fluoride crystals shape and form.

The reaction between ammonium fluoride and the calcium carbonate produces a slurry containing calcium fluoride and ammonium carbonate.

Said slurry is then filtered using vacuum filter with a pore size of 100 μm or more preferably using press filter, so as to obtain, on the one hand, a filter cake containing calcium fluoride and, on the other hand, a filtrate containing a solution of ammonium carbonate. To enhance calcium fluoride crystallization a determined quantity of the calcium fluoride slurry (typically ranging from 10 to 70% by weight) is returned to the reactor while the remaining calcium fluoride slurry is separated by filtration using press filter to recover the calcium fluoride product. With this recirculation of the slurry, the supersaturation ratio of calcium fluoride is increased in the reactor, which increases the crystallization growth of calcium fluoride particles and allows obtaining big and uniform crystals that will enhance the granulometry distribution of the calcium fluoride particles. The granulometry of calcium fluoride is a key specification for using synthetic calcium fluoride as substitute of Acidspar.

Then, the filter cake is washed and dried so as to obtain calcium fluoride and a filter cake washing containing a solution of ammonium carbonate.

The products of the second process step are thus calcium fluoride ($CaF_2$) (as a solid form) and ammonium carbonate (($NH_4)_2CO_3$) (as a liquid form).

By using calcium carbonate which is an ultrapure calcium source (contrary to calcium hydroxide which contains impurities), calcium fluoride is easily obtained with a very high purity.

Hence, the second process step produces two ammonium carbonate solutions: the first one is the filtrate resulting from filtration of the slurry and the second one is the filter cake washing.

As far as ammonia recycling is concerned, the major part of ammonia and carbon dioxide are evolved from the calcium fluoride reactor because of the partial decomposition of ammonium carbonate under reactor conditions and then are scrubbed and returned to the silica reactor, both ammonium carbonate solutions are then gathered and treated by distillation and condensation to recover liquid ammonia.

Said ammonia can thus be recycled in the first process step to neutralize fluosilicic acid. This recycling allows minimizing the cost of the process of fabrication of calcium fluoride.

The reactions mechanisms are:
First process step: neutralization of fluosilicic acid with $NH_3$ or $NH_4OH$:

$$H_2SiF_6 \cdot 2H_2O + 6NH_4OH \rightarrow 6NH_4F + SiO_2\downarrow + 6H_2O$$

or $$H_2SiF_6 \cdot 2H_2O + 6NH_3 \rightarrow 6NH_4F + SiO_2\downarrow$$

Second process step: precipitation of $NH_4F$ with limestone ($CaCO_3$):

$$2NH_4F + CaCO_3 \rightarrow CaF_2\downarrow + CO_2\uparrow + 2NH_3\uparrow + H_2O$$

The process of the present invention makes it possible to use crude fluosilicic acid of high concentration, for example having concentration from 5 to 40% by weight for producing high grade synthetic calcium fluoride and active silica ($SiO_2$).

The calcium fluoride produced is entirely suitable for the production of hydrogen fluoride in accordance with conventional processes.

At the same time, the active silica is produced in such grade that it can be added in phosphoric acid manufacturing to adjust the active silica deficiency in phosphate rock, also because it has excellent properties it can be used for producing synthetic resins, rubber, paints and paper.

This new process allows avoidance of the disadvantages of previously known processes, particularly in the sense that it uses the ammonia route ($NH_3$ or $NH_4OH$) for the neutralization of the fluosilicic acid for having an excellent silica sol precipitation and separation.

The obtained liquid solution is the ammonium fluoride (NH4F) which can easily precipitate by adding a high grade limestone ($CaCO_3$).

The main advantages are:
- The process can be fed by various grades of fluosilicic acid.
- The process can be fed by either of ammonia forms (liquid or gas).
- The process has high efficiency.
- The separation of active silica is good.
- High grade active silica is obtained.
- The separation of calcium fluoride is good.
- High grade calcium fluoride is obtained.
- The grain size of the calcium fluoride is acceptable in view of the conventional processes requirement for hydrogen fluoride production.

The FIGURE illustrates a scheme for carrying out the process according to the invention.

The first process step comprises the production of the active silica by the reaction of an aqueous solution of fluosilicic acid (FSA) at the concentration of 5 to 40% by weight, with a basic solution of ammonium hydroxide containing 10 to 35% by weight as $NH_3$, or with liquid ammonia $NH_3$. The reaction mixture is conducted in reactor 1 under specific conditions such as good agitation, favorable temperature between 20° and 90° C., pH ranging from 5 to 11 and 15 to 360 min of residence time. The pH is advantageously chosen so as to allow precipitation of all the fluosilicic acid into amorphous precipitated silica. The residence time impacts the morphology of the amorphous precipitated silica. The obtained slurry is then separated by filtration in filter 2 using vacuum filter with a pore size of 100 μm or more preferably using press filter, and the active silica (silicon dioxide) is washed and dried at 110° C. The active silica has a high silicon dioxide content ranging from 50 to 90 by weight, and consists of particles having an average diameter of 32 μm with 67.5% by volume less than 40 μm, and a specific surface measured by the laser granulometry of 112 $m^2/g$.

The cake washing is a diluted solution of ammonium fluoride which is recycled to the fluosilicic acid stirred reactor 1 or to the reactor 3, and the filtrate which is a solution of the ammonium fluoride is sent to the second process step in which the ammonium fluoride is reacting with limestone as a calcium source, to produce high grade calcium fluoride meeting the specifications for commercial fluorspars.

The precipitation of the ammonium fluoride is performed in a stirred reactor 3 in which a suspension of calcium carbonate at the concentration from 10 to 80% by weight is added. The temperature varies between 60° to 90° C., the pH is of 6 to 12 and the residence time is about 30 to 60 min. The pH and residence time are advantageously selected to allow the precipitation of all the $NHF_4$ into $CaF_2$ which has good crystalline properties. The required quantity of calcium carbonate is chosen to meet a weight ratio of Ca/F greater than 0.5 in the reaction mixture. To enhance calcium fluoride crystallization a quantity ranging from 10 to 70% of the calcium fluoride slurry is returned to the reactor 3, the remaining calcium fluoride slurry is separated by filtration in filter 4 to recover the calcium fluoride product, which is washed and dried in drier 5.

The calcium fluoride purity depends on the purity of the calcium source. It can reach more than 97% of $CaF_2$ by weight since calcium carbonate—which has a high purity—is used. Silicon dioxide content is less than 1.5% by weight because of the good silicon dioxide separation in the first process step. Regarding the particles of calcium fluoride, the average diameter is about 20 μm with 87% by volume less than 40 μm, and the specific area is 278 $m^2/g$, much higher particles diameters will be achieved by adjusting the calcium fluoride slurry recycling or if required by using decantation before calcium fluoride filtration. Also, a granulation of particles can be made after drying.

After the calcium fluoride slurry filtration, both the filtrate and the filter cake washing solution, which are diluted ammonium carbonate solutions, are collected in a tank 6 and treated by distillation and condensation to obtain a solution of ammonia. Said ammonia is reused, as it is or as an ammonium carbonate solution ranging from 10 to 30% $NH_3$ by weight, for feeding the fluosilicic acid neutralization.

In comparison to the known processes, the production of calcium fluoride from fluosilicic acid using ammonia route according to the invention represents a new process in the sense that it uses for the first time the ammonia and calcium carbonate to convert fluosilicic acid into calcium fluoride at a competitive cost by enhancing reactions efficiency and adopting a strong strategy for ammonia recycling, the calcium fluoride obtained is meeting the specifications for commercial fluorspars, due to its high degree of purity and its good granulometry.

Furthermore the active silica (silicon dioxide) also called amorphous precipitated silica is easily separated before the calcium fluoride precipitation and separation To make the most economic and sustainable process, the major part of ammonia is evolved from the calcium fluoride reactor 3 because of the partial decomposition of ammonium carbonate under reactor conditions and then scrubbed and returned to the silica reactor, both ammonium carbonate solutions obtained in step (b) as the filtrate and the filter cake washing are then gathered and treated by distillation and condensation to recover liquid ammonia which is recycled to the silica reactor 1.

The foregoing description and the following examples relate to several specific embodiments of the process, and it is to be understood that this description is intended to be illustrative only and not in any sense limitative. It is not intended to exclude other possible embodiments which permit carrying out the reaction of the production of the high grade calcium fluoride from fluosilicic acid using ammonia route.

Example 1

252 grams of fluosilicic acid solution having a concentration of 32% by weight, which is a commercial fluosilicic acid, was fed into a stirred reaction vessel of 1 liter. The solution in the reaction vessel was stirred at a rate of 250 rpm. During stirring, 380 grams of an ammonium hydroxide solution having a concentration of 25% (wt) as $NH_3$ was injected just below the liquid surface. The residence time of the reaction mixture was about 60 minutes and the final pH was about 8.3 while the temperature decreased from 61° to 28° C. The reaction mixture was subsequently filtered, the resulting filter cake washed with distilled water and dried at 110° C. Under these conditions the neutralization yield of fluorine was 81.24%. The chemical analysis and the X-Ray diffractometry of the dried cake showed the production of the ammonium silicofluoride and not the active silica.

Comparative Example

Under the same conditions as Example 1, 350 grams of fluosilicic acid solution having a concentration of 23% by weight, which was prepared by dilution of the commercial fluosilicic acid having 32% (wt). During stirring, 507 grams of an ammonium hydroxide solution having a concentration of 25% (wt) as $NH_3$ was used. The final pH of the reaction mixture was about 9.4. Under these conditions, there was no formation of silicofluoride but only active silica, the neutralization yield of fluorine was 97.88%. The chemical analysis of the dried cake showed the obtaining of the active silica ($SiO_2$).

Example 2

80 grams of ammonium fluoride having a concentration of 8.47% by weight, recovered from the fluosilicic acid neutralization step, was fed into a reaction vessel provided with stirrer. The solution in the reaction vessel was stirred at rate of 250 rpm. During stirring, 71.4 grams of a suspension (19.5% wt) of calcium hydroxide having a concentration of 74.16% wt was fed to carry out a weight ratio of $NH_4F/CaO$ equivalent to 2.1. The residence time of the reaction mixture was about 30 minutes and the final pH was about 10 while the temperature decreased from 21° to 16° C. The reaction mixture was subsequently filtered, the resulting filter cake washed with distilled water and dried at 110° C. Under these conditions the precipitation yield of fluorine was 87.62%. The chemical analysis and the X-Ray diffractometry of the dried cake showed the obtaining of calcium fluoride.

Comparative Example A

Under conditions identical in all respects with those of Example 2, 96 grams of ammonium fluoride having a concentration of 8.47% by weight was fed into a reaction vessel provided with stirrer. During stirring, 71.4 grams of a suspension (19.5% wt) of calcium hydroxide having a concentration of 74.16% wt was fed to carry out a weight ratio of $NH_4F/CaO$ equivalent to 2.2. The residence time of the reaction mixture was about 30 minutes and the final pH was about 9.8. Under these conditions the precipitation yield of fluorine was 69.75%. The chemical analysis and the X-Ray diffractometry of the dried cake showed the obtaining of the calcium fluoride.

Comparative Example B

Under conditions identical in all respects with those of Example 2, 100 grams of ammonium fluoride having a concentration of 6.49% by weight was fed into a reaction vessel provided with stirrer. During stirring 50 grams of a suspension (25% wt) of calcium hydroxide having a concentration of 94.76% wt was fed to carry out a weight ratio of $NH_4F/CaO$ equivalent to 2. The residence time of the reaction mixture was about 30 minutes and the final pH was about 10.7. Under these conditions the precipitation yield of fluorine was 96.66%. The chemical analysis and the X-Ray diffractometry of the dried cake showed the obtaining of calcium fluoride.

Example 3

200 grams of fluosilicic acid solution having a concentration of 23% by weight, which was prepared by dilution of the commercial fluosilicic acid having 32% wt, was fed into a reaction vessel of 1 liter provided with stirrer. The solution in the reaction vessel was stirred at rate of 250 rpm. During stirring, 308 grams of an ammonium hydroxide solution having a concentration of 25% (wt) as $NH_3$ was injected just below the skin of the liquid surface. The residence time of the reaction mixture was about 60 minutes and the final pH was about 9.6 while the temperature decreased from 54° to 20° C. The reaction mixture was subsequently filtered, the resulting filter cake washed with distilled water and dried at 110° C. Under these conditions the maximum neutralization yield of fluorine was 98.22% depending of silica morphology and process filtration parameters. The chemical analysis showed the obtaining of active silica which has a high silicon dioxide content ranging from 50 to 90 by weight depending on the filtration technology, and consists of particles having an average diameter of 30 μm with 67% by volume less than 40 μm, and a specific surface measured by the laser granulometry of 112 m²/g. The cake washing which is a diluted solution of ammonium fluoride of 76 grams having a concentration of 6.79% (wt), is recycled to the fluosilicic acid stirred reactor. The filtered solution of the ammonium fluoride having 286.6 grams and a fluorine content of 7.04% (wt), is sent to the second process step for reacting with 86.7 grams of a suspension (40% wt) of calcium hydroxide having a concentration of 94.76% (wt). At this stage the molar ratio of $NH_4F/CaO$ is equivalent to 2. The residence time of the reaction mixture was about 60 minutes and the final pH was about 10.7. The reaction mixture was subsequently divided into two parts: 60% was returned to the calcium fluoride reactor and 40% was filtered; the resulting filter cake was washed with distilled water and dried at 110° C. Under these conditions the precipitation yield of fluorine was 96.66%. The chemical analysis and the X-Ray diffractometry of the dried cake showed the obtaining of calcium fluoride, which meets the specifications for commercial fluorspars. The calcium fluoride purity was 91% $CaF_2$. Silicon dioxide content is less than 1.5%. As regards the particles of calcium fluoride, the average diameter is about 12 μm with 87% by volume less than 40 μm, and the specific surface measured by the laser granulometry was 276 m²/g, much higher particles diameters being achieved by adjusting the calcium fluoride slurry recycling or if required by using decantation before calcium fluoride filtration. Also, a granulation of particles can be made after drying.

Example 4

400 grams of fluosilicic acid solution having a concentration of 23% by weight, which was prepared by dilution of the commercial fluosilicic acid having 32% wt, was fed into a reaction vessel of 1 liter provided with stirrer. The solution in the reaction vessel was stirred at rate of 250 rpm. During stirring, a stoichiometric quantity of ammonia was injected in the bottom of the silica reactor. The residence time of the reaction mixture was about 60 minutes and the final pH was about 9.5 while the temperature decreased from 85° to 45° C. The reaction mixture was subsequently filtered, the resulting filter cake washed with distilled water and dried at 110° C. Under these conditions the neutralization yield of fluorine was 81.69%. The chemical analysis showed the obtaining of active silica which has a high silicon dioxide content ranging from 80 to 90 by weight depending on the filtration technology, and consists of particles having an average diameter of 36 μm with 56% by volume less than 40 μm, and a specific surface measured by the laser granulometry of 200 m²/g. The cake washing which is a diluted solution of ammonium fluoride of 159 grams having 13.44% (wt) fluorine, is recycled to the fluosilicic acid stirred reactor. The filtered solution of the ammonium fluoride having 357 grams and a fluorine content of 17.30% (wt), is sent to the second process step for reacting with 410 grams of a suspension (40% wt) of high grade calcium carbonate having 55.55% CaO content. At this stage, the weight ratio of $NH_4F/CaO$ is equivalent to 1.3. The residence time of the reaction mixture was about 30 minutes and the final pH was about 11.5. The reaction mixture was filtered; the resulting filter cake was washed with distilled water and dried at 110° C. Under these conditions the precipitation yield of fluorine was 96.70%. The chemical analysis and the X-Ray diffractometry of the dried cake showed the obtaining of calcium fluoride, which meets the specifications for commercial fluorspars. The calcium fluoride purity is 97.95% $CaF_2$. Silicon dioxide content is less than 1%. As regards the particles of calcium fluoride, the granulometry is about 40% under 45 μm and 20% above 150 μm, much higher particles diameters being achieved by adjusting the calcium fluoride slurry recycling or if required by using decantation before calcium fluoride filtration. In addition, a granulation of particles can be made after drying.

REFERENCES

U.S. Pat. No. 2,780,521
U.S. Pat. No. 2,780,523
U.S. Pat. No. 4,031,193
U.S. Pat. No. 3,271,107
U.S. Pat. No. 6,224,844
U.S. Pat. No. 4,915,705
CN. Pat. No 103073040
CN. Pat. No 102502753

The invention claimed is:

1. A process for preparing synthetic calcium fluoride ($CaF_2$) from fluosilicic acid, comprising the following steps:
(a) directly reacting fluosilicic acid ($H_2SiF_6$) with ammonium hydroxide or ammonia in a first reactor so as to obtain a first slurry; filtering said first slurry so as to obtain a filtrate containing a solution of ammonium fluoride;
(b) precipitating ammonium fluoride the solution of ammonium fluoride obtained as a filtrate in step (a) with calcium carbonate ($CaCO_3$) as a dry form or as a suspension at a concentration ranging from 10 to 80% by weight in a second reactor so as to produce a second slurry containing a precipitate of calcium fluoride and ammonium carbonate; producing a first ammonium carbonate solution by filtering said second slurry so as to obtain a filter cake containing calcium fluoride and a filtrate containing the solution of ammonium carbonate; producing a second ammonium carbonate solution by washing and drying said filter cake so as to obtain calcium fluoride and a filter cake washing containing the second solution of ammonium carbonate; wherein a portion of the second slurry ranging from 10 to 70% is recycled to the second reactor so as to enhance calcium fluoride crystallization in the second reactor;
(c) evolving the major part of ammonia from the second reactor in step (b) because of partial decomposition of ammonium carbonate under the second reactor conditions and then scrubbing and returning said ammonia to the first reactor; gathering and treating by distillation and condensation the first and second ammonium carbonate solutions to recover liquid ammonia; and recycling the recovered liquid ammonia to the first reactor, wherein the calcium fluoride obtained at step (b) presents a purity greater than or equal to 90% wt $CaF_2$.

2. The process of claim 1, wherein at step (a) the first slurry contains amorphous precipitated silica, the filtration of the first slurry produces a filter cake containing the amorphous precipitated silica and said silica cake is further washed and dried.

3. The process of claim 1, wherein the concentration of the fluosilicic acid used in step (a) is between 5 and 40% by weight.

4. The process of claim 1, wherein the fluosilicic acid used in step (a) is a by-product of phosphate rock acidulation.

5. The process of claim 1, wherein the conditions of the reaction carried out in the first reactor (1) in step (a) comprise:
agitation of the mixture;
a temperature between 20 and 90° C.;
a pH ranging from 5 to 11; and
a residence time between 15 and 360 minutes.

6. The process of claim 2, wherein the washing of the filter cake in step (a) produces filter cake washing that contains a solution of ammonium fluoride, said solution of ammonium fluoride being recycled to the first reactor or to the second reactor.

7. The process of claim 1, wherein the pH of calcium fluoride precipitation in step (b) is in the range of 6 to 12 and the weight ratio Ca/F between the ammonium fluoride and the calcium carbonate is greater than 0.5.

8. The process of claim 1, wherein the conditions of the reaction carried out in the second reactor in step (b) comprise:
agitation of the mixture;
a temperature between 60 and 90° C.;
a pH ranging from 6 to 12; and
a residence time between 30 minutes and 60 minutes.

9. A process for preparing synthetic calcium fluoride ($CaF_2$) from fluosilicic acid, comprising the following steps:
(a) reacting fluosilic acid ($H_2SiF_6$) with ammonium hydroxide or ammonia in a first reactor so as to obtain a first slurry; filtering said first slurry so as to obtain a filtrate containing a solution of ammonium fluoride;
reacting ammonium fluoride from the solution of ammoonium fluoride obtained as a filtrate in step (a) with calcium carbonate ($CaCO_3$) as a dry form or as a suspension at a concentration ranging from 10 to 80% by weight in a second reactor so as to produce a second slurry containing a precipitate of calcium fluoride and ammonium carbonate; producing a first ammonium carbonate solution by filtering said second slurry so as to obtain a filter cake containing calcium and a filtrate containing the first solution of ammonium carbonate; producing a second ammonium carbonate solution by washing and drying said filter cake so as to obtain calcium fluoride and a filter cake washing containing the second solution of ammonium carbonate; wherein a portion of the second slurry ranging from 10 to 70% is recycled to the second reactor so as to enhance calcium fluoride crystallization in the second reactor;
(c) evolving at least half of ammonia from the second reactor in step (b) because of partial decomposition of ammonium carbonate under the second reactor conditions and then scrubbing and returning said ammonia to the first reactor; gathering and treating by distillation and condensation the first and second ammonium carbonate solution to recover liquid ammonia; and recycling the recovered liquid ammonia to the first reactor, wherein in step (a) the first slurry contains amorphous precipitated silica, the filtration of the first slurry producing a filter cake containing said amorphour precipitated silica and said silica cake is further washed and dried to produce high grade acvtive silica.

10. A process for preparing synthetic calcium fluoride ($CaF_2$) from fluosilicic acid, comprising the following steps:
(a) directly reacting fluosilicic acid ($H_2SiF_6$) with ammonium hydroxide or ammonia in a first reactor so as to obtain a first slurry; filtering said first slurry so as to obtain a filtrate containing a solution of ammonium fluoride;
(b) reacting ammonium fluorie from the solution of ammonium fluoride obtained as a filtrate in step (a) with calcium carbonate ($CaCO_3$) as a dry form or as a suspension at a concentration ranging from 10 to 80% by weight in a second reactor so as to produce a second slurry containing a precipitate of calcium fluoride and ammonium carbonate; producing a first ammonium carbonate solution by filtering said second slurry so as to obtain a filter cake containing calcium fluoride and a filtrate containing the first solution of ammonium carbonate; producing a second ammonium carbonate solution by washing and drying said filter cake so as to obtain calcium fluoride and a filter cake washing containing the second solution of ammonium carobnate; wherein a portion of the second slurry ranging form 10 to 70% is recycled to the second reactor so as to enhance calcium fluoride crystallization in the second reactor;

(c) evolving at least half of ammonia from the second reactor in step (b) because of partial decomposition of ammonium carbonate under the second reactor conditions and then scrubbing and returning said ammonia to the first reactor; gathering and treating by distillation and condensation the first and second ammonium carbonate solutions to recover liquid ammonia; and recycling the recovered liquid ammonia to the first reactor, wherein in step (a) the first slurry contains amorphous precipitated silica, the filtration of the first slurry producing a filter cake containing said amorphous precipitated silica and said silica cake is further washed and dried, and the washing of the filter cake in step (a) produces filter cake washing that contains a solution of ammonium fluoride, said solution of ammonium fluoride being recycled to the first reactor or to the second reactor.

* * * * *